(12) United States Patent
Czoka et al.

(10) Patent No.: US 7,921,713 B2
(45) Date of Patent: Apr. 12, 2011

(54) TEST FIXTURE

(75) Inventors: Jeff Alan Czoka, Peoria, AZ (US); Tom Edward Stubblefield, Surprise, AZ (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 185 days.

(21) Appl. No.: 12/276,032

(22) Filed: Nov. 21, 2008

(65) Prior Publication Data

US 2010/0126262 A1   May 27, 2010

(51) Int. Cl.
*G01M 17/04* (2006.01)

(52) U.S. Cl. .................. 73/117.03; 73/11.04; 73/11.07; 73/669

(58) Field of Classification Search ............... 73/117.03, 73/669, 11.05, 11.07, 11.08, 11.04
See application file for complete search history.

(56) References Cited

U.S. PATENT DOCUMENTS

| | | | |
|---|---|---|---|
| 3,459,037 A | 8/1969 | Holzman | |
| 3,827,289 A | 8/1974 | Borg | |
| 4,002,051 A | 1/1977 | Hilbrands et al. | |
| 4,658,656 A | 4/1987 | Haeg | |
| 4,951,504 A * | 8/1990 | Klock et al. | 73/117.03 |
| 5,072,611 A * | 12/1991 | Budd et al. | 73/115.07 |
| 5,083,453 A * | 1/1992 | Daley | 73/118.01 |
| 5,189,920 A | 3/1993 | Martinez | |
| 5,241,856 A * | 9/1993 | Petersen et al. | 73/118.01 |
| 5,277,584 A | 1/1994 | DeGroat et al. | |
| 5,315,882 A * | 5/1994 | Meyer et al. | 73/862.44 |
| 5,465,615 A * | 11/1995 | Petersen et al. | 73/115.07 |
| 5,487,301 A | 1/1996 | Muller et al. | |
| 5,533,403 A * | 7/1996 | Haeg et al. | 73/669 |
| 5,569,836 A * | 10/1996 | Hill | 73/11.07 |
| 5,633,464 A * | 5/1997 | Haeg et al. | 73/669 |
| 5,700,951 A | 12/1997 | Sagiyama et al. | |
| 5,942,673 A * | 8/1999 | Horiuchi et al. | 73/11.04 |
| 6,247,348 B1 | 6/2001 | Yamakado et al. | |
| 6,575,037 B2 * | 6/2003 | Momoi et al. | 73/633 |
| 6,640,638 B1 * | 11/2003 | Haeg et al. | 73/669 |
| 6,725,168 B2 | 4/2004 | Shiraishi et al. | |
| 7,117,730 B2 | 10/2006 | Karrer et al. | |
| 7,174,776 B2 | 2/2007 | Temkin et al. | |
| 2006/0130567 A1 | 6/2006 | Ben-David | |
| 2009/0056431 A1* | 3/2009 | Jones | 73/118.03 |

FOREIGN PATENT DOCUMENTS

DE   19958387   6/2001

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

A test fixture for testing a motor vehicle suspension, brake components and wheel components on a motor vehicle sub-frame is provided. The test fixture can include a lower frame attached to a base surface and be dimensioned for the motor vehicle sub-frame to be attached thereto. An upper frame oppositely disposed to the lower frame and dimensioned to attach to the sub-frame is also included. A shaker system is attached to the base surface and is operable to provide a predetermined vertical displacement profile to the sub-frame. A motor is attached to an axle assembly on the sub-frame and is operable to rotate a wheel component at a predetermined rate of rotation. A non-contact gap sensor is included and can be attached to the sub-frame and detect or monitor movement between a first sub-frame component and a second sub-frame component.

18 Claims, 5 Drawing Sheets

TEST FIXTURE

FIELD OF THE INVENTION

The present invention relates to a test fixture, in particular to a test fixture for vehicle motion simulation.

BACKGROUND OF THE INVENTION

Test fixtures and methods for analyzing and testing the suspension of a motor vehicle can vary from the use of sensors on the motor vehicle suspension during actual driving of the vehicle to complex platforms that allow for a motor vehicle to be placed thereon. Heretofore test fixtures have used dummy road surfaces to simulate a road surface which the motor vehicle rides on with vibrations applied to the motor vehicle and/or a component of the motor vehicle. Such test fixtures increase the complexity of the testing and may or may not apply vibration to an underside of a component to be tested as would occur during normal driving. In addition, such test fixtures typically require a special dummy chassis supported by a plurality of actuators and thus do not use actual vehicle components that would properly simulate real vehicle suspension movement with factory alignment settings. In the alternative, test fixtures that allow for an entire motor vehicle to be placed thereon are complex and costly. As such, an improved test fixture and method that affords for the rotation of a wheel component and/or application of vibration to a vehicle sub-frame while using actual vehicle components would be desirable.

SUMMARY OF THE INVENTION

A test fixture for testing a motor vehicle suspension, brake components and wheel components on a motor vehicle sub-frame is provided. The test fixture can include a base surface and a lower frame that is attached to the base surface and dimensioned for the sub-frame of a motor vehicle to be attached thereto. In addition, an upper frame that is oppositely disposed to the lower frame and dimensioned to attach to the sub-frame can also be provided. The lower frame and the upper frame are operable to hold the sub-frame above the base surface and allow changes in alignment of the wheel components on the sub-frame. A shaker system is attached to the base surface and dimensioned to attach to the sub-frame, the shaker system being operable to provide a predetermined vertical displacement profile to the sub-frame. In addition, a motor can be attached to an axle assembly on the sub-frame and be operable to rotate a hub, brake rotor and/or the like at a predetermined rate of rotation. The shaker system can be attached to the sub-frame using a shaker rod, the shaker rod having a pair of opposing ends with each having a heim joint for attachment.

Also included can be at least one non-contact gap sensor that is operable to attach to the sub-frame and detect movement between a first sub-frame component and a second sub-frame component. The non-contact gap sensor can be located on an inboard side of the axle assembly and the first sub-frame component and the second sub-frame component can be a brake housing, a rotor, a leading inboard caliper, a leading inboard brake pad, a trailing inboard brake pad and/or a trailing inboard caliper. In addition, a non-contact gap sensor can be located on an outboard side of the axle assembly with the first sub-frame component and the second sub-frame component being a brake housing, a rotor, a leading outboard brake pad and/or a trailing outboard brake pad.

A process for testing a motor vehicle suspension, brake components and wheel components on a motor vehicle sub-frame is also included. The process can include providing a lower frame attached to a base surface, the lower frame being dimensioned for a lower side of the sub-frame to be attached thereto. After the lower frame is provided, the sub-frame is attached thereto and an upper frame is provided that is oppositely disposed to the lower frame and attached to an upper side of the sub-frame. A shaker system is provided that is operable to provide a predetermined vertical displacement profile to the sub-frame, the shaker system being attached to the base surface and the sub-frame. A motor that is operable to rotate a hub, rotor and/or the like on the sub-frame is provided and attached thereto. At least one non-contact gap sensor operable to detect movement between a first sub-frame component and a second sub-frame component is provided and attached to the sub-frame. A vertical displacement profile is applied to the sub-frame using the shaker system and detection of the movement between the first sub-frame component and the second sub-frame component using the non-contact gap sensor is detected. In addition, rotation of the rotor using the motor can be applied independently and thereby afford for the detection of the movement between the first sub-frame component and the second sub-frame component while rotation of a wheel component and/or vibration of the sub-frame is present.

DETAILED DESCRIPTION OF THE INVENTION

Figure 1:
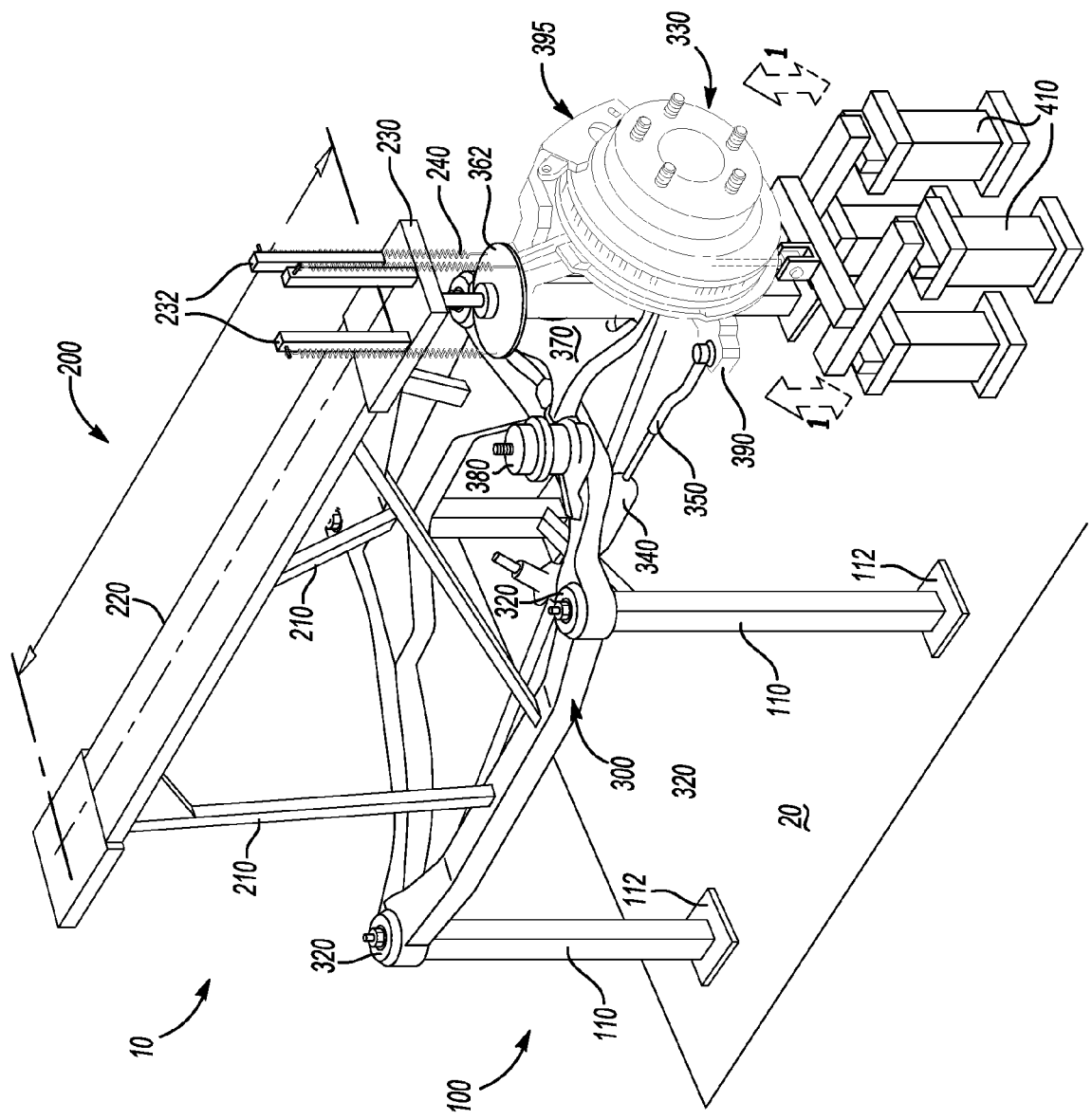
FIG. 1 is a perspective view illustrating a test fixture with a sub-frame attached thereto according to an embodiment of the present invention.

The present invention provides a test fixture and/or a method for testing a motor vehicle suspension, brake components and wheel components on a motor vehicle sub-frame. As such, the test fixture and/or method have utility as a testing component or testing method for a motor vehicle.

The test fixture can include a base surface, a lower frame, an upper frame, a shaker system, a motor and/or at least one non-contact gap sensor. The lower frame can be attached to the base surface and is dimensioned for a sub-frame of a motor vehicle to be attached thereto. In some instances, the lower frame is attached to a lower side of the sub-frame. The upper frame is oppositely disposed to the lower frame and also dimensioned to attach to the motor vehicle sub-frame. If the lower frame is attached to the lower side of the sub-frame, then the upper frame is attached to an upper side of the sub-frame. When the sub-frame is attached to the lower frame and the upper frame, the sub-frame is held above the base surface and affords for changes in alignment of wheel components on the sub-frame.

The shaker system is dimensioned to attach to the base surface and the sub-frame, and operable to provide a predetermined vertical displacement profile to the sub-frame and the motor can be attached to an axle assembly on the sub-frame and is operable to rotate a hub, rotor and/or the like at a predetermined rate of rotation. The at least one non-contact gap sensor can be attached to the sub-frame and is operable to detect movement between a first sub-frame component and a second sub-frame component. The shaker system can be attached to the sub-frame using a shaker rod, the shaker rod having a pair of opposing ends with at least one of the ends having a heim joint that provides a rotational attachment between the shaker rod and the sub-frame.

In some instances, the non-contact gap sensor can be located on an inboard side of the axle assembly and the first sub-frame component and the second sub-frame component can be a brake housing, a rotor, a leading inboard caliper, a leading inboard brake pad, a trailing inboard brake pad and/or a trailing inboard caliper. It is appreciated that more than one non-contact gap sensor can be provided and thereby afford for the detection or monitoring of movement between more than one first sub-frame component and/or more than one second sub-frame component. In other instances, the non-contact gap sensor can be located on an outboard side of the axle assembly and the first sub-frame component and the second sub-frame component can be a brake housing, a rotor, a leading outboard brake pad and/or a trailing outboard brake pad. It is further appreciated that at least one non-contact gap sensor can be located on the inboard side of the axle assembly and more than one non-contact gap sensor can be located on the outboard side of the axle assembly.

A process for testing the motor vehicle suspension, brake components and wheel components on the motor vehicle sub-frame can include providing a lower frame attached to a base surface and attaching an actual motor vehicle sub-frame to the lower frame. It is appreciated that the terms "actual motor vehicle sub-frame," "actual sub-frame," "actual components" and the like are also known as commercially available sub-frames, components, etc. In addition, an upper frame is provided and attached to the sub-frame and a shaker system is attached to a lower side of the sub-frame. A motor is attached to a sub-frame axle assembly frame and at least one non-contact gap sensor is attached to the sub-frame. A shaker system is attached to the sub-frame and applies a vertical displacement profile to the sub-frame with movement between a first sub-frame component and a second sub-frame component detected or monitored using the non-contact gap sensor. In some instances, rotation is applied to a hub, rotor and/or the like either alone or in combination with the vertical displacement profile and thereby affords for detection or monitoring of movement between separate sub-frame components during vibration of the sub-frame and/or rotation of a wheel component.

A test fixture assembly can be provided wherein an actual motor vehicle sub-frame is attached to the lower frame and the upper frame, with the upper frame having a spring member operable to adjust a ride height on the sub-frame. In addition, the detection or monitoring of the movement between sub-frame components can be accomplished before and/or after changing an alignment of the wheel components on the sub-frame. In some instances, the changing of the alignment of the wheel component includes changing the camber of the wheel components, changing the caster of the wheel components and/or changing the toe of the wheel components.

Turning now to FIG. 1, an embodiment of a test fixture is shown generally at reference numeral 10. The test fixture 10 includes a lower frame 100 and an upper frame 200. The lower frame 100 can include at least one leg 110 and an optional mounting plate 112 that affords for attachment of the leg 110 to a base 20. In some instances, the lower frame 100 has a plurality of legs 110 that are dimensioned to afford for an actual motor vehicle sub-frame 300 to attach thereto as illustratively shown in the figure. The upper frame 200 can include at least one leg 210, an upper beam member 220 and a support plate 230.

The sub-frame 300 can be attached to the leg 110 at an attachment location 320 and the upper frame 200 attached to the sub-frame 300 at an attachment location 212. It is appreciated that the sub-frame 300 can be attached to the upper frame 100 and lower frame 200 using any device, apparatus, etc., known to those skilled in the art, illustratively including threaded fasteners, clamps, welding and the like. In some instances, the sub-frame 300 can include elastomer bushings at the attachment location 320 in order to simulate the attachment of the sub-frame 300 to a motor vehicle chassis. The sub-frame 300 can also include an axle assembly 330, a steering gear housing 340, a tie rod 350, a shock absorber 360, a suspension arm 370, an engine mount insulator 380 and/or other components that are known to be included as part of or attached to a motor vehicle sub-frame by one skilled in the art.

Figure 2:
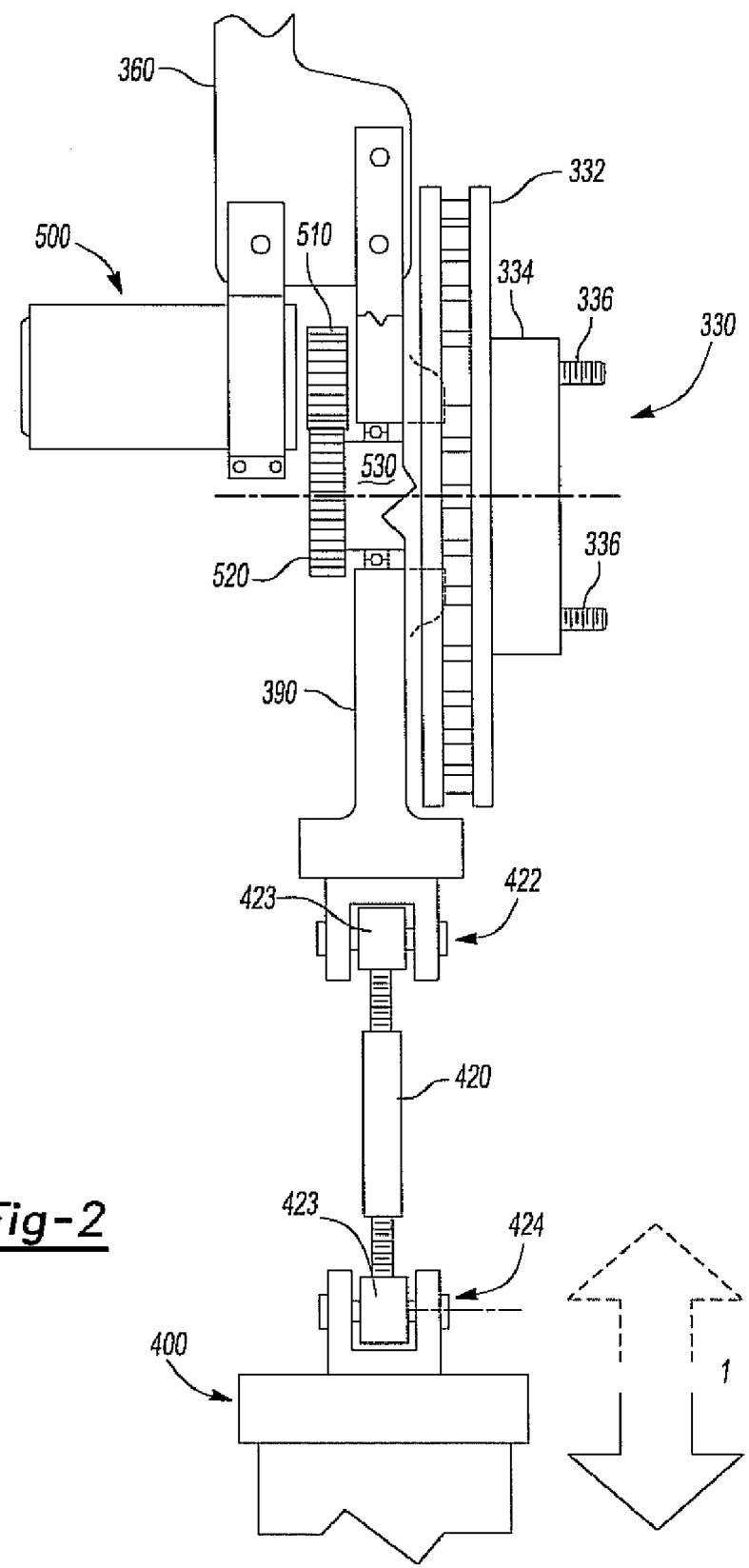
FIG. 2 is a side view illustrating an axle assembly of a sub-frame attached to a shaker system.
Figure 3:
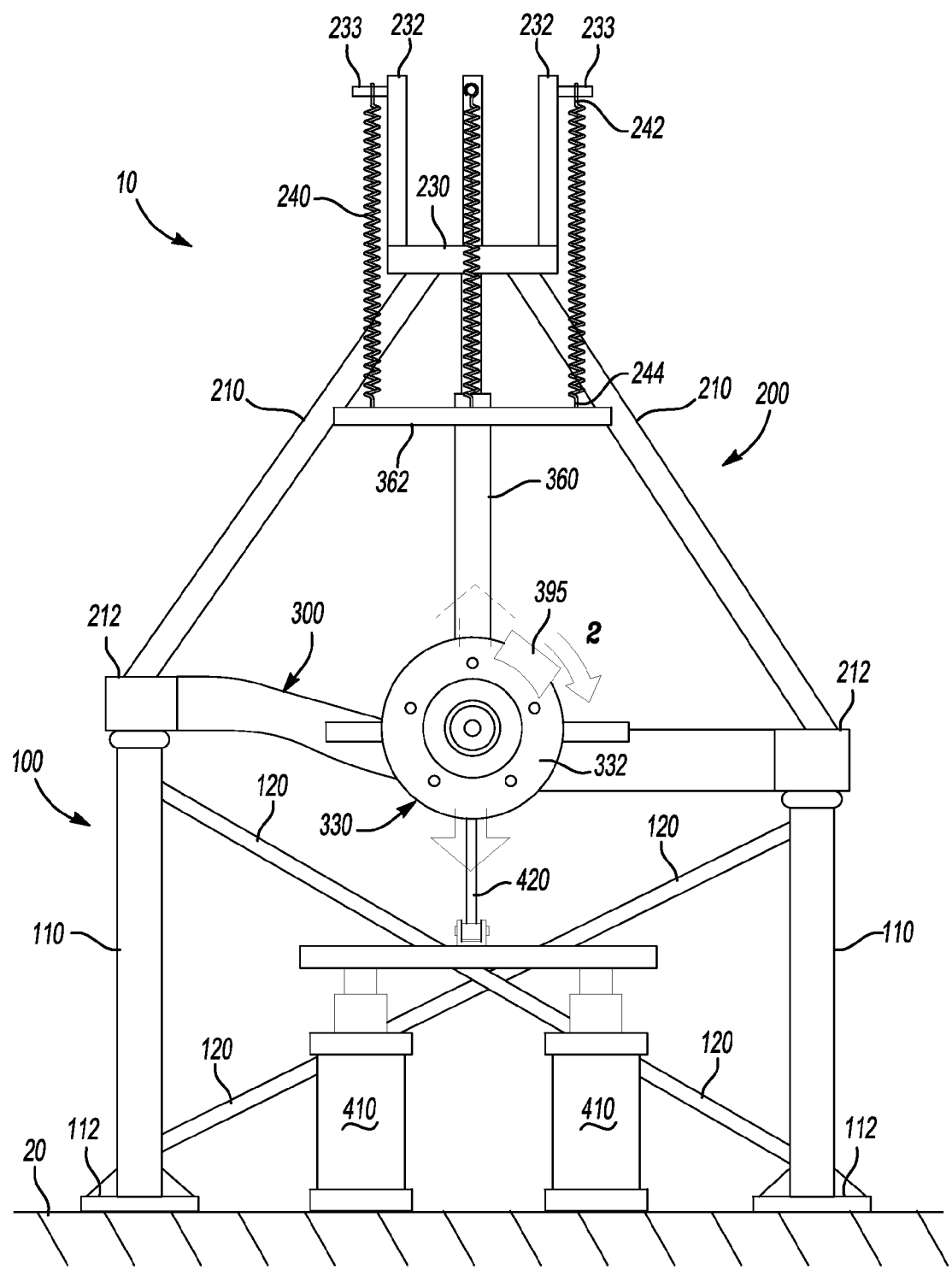
FIG. 3 is an end view of the embodiment shown in FIG. 1.

Referring now to FIGS. 1-3, a shaker system 400 can be included with one or more shakers 410 attached to the sub-frame 300 via a shaker rod 420. The shaker rod 420 can include a first end 422 and a second end 424, one or both of the ends including a heim joint 423 that affords for movable attachment between the shaker system 400 and the sub-frame 300. In some instances, and as shown in FIG. 2, the shaker system 400 can be attached to the sub-frame 300 by the shaker rod 420 being attached to a steering knuckle 390 of the axle assembly 330. In addition, the lower frame 100 can have one or more cross braces 120 that provide structural support between one or more of the legs 110. In this manner, a structurally sound lower frame 100 is provided onto which the sub-frame 300 can be attached. The shock absorber 360 can be attached to the support plate 230 with one or more ride height adjustment members 240 affording for a predefined ride height of the axle assembly 330, shock absorber 360 and suspension lower arm 370 relative to the shaker system 400.

A motor 500 can be included and drivably attached to a hub 334 of the axle assembly 330. The motor 500 can include a first gear 510 and a second gear 520 in combination with a drive shaft 530 that is attached to the hub 334. The hub 334 can include a rotor 332 and at least one threaded stud 336. It is appreciated that the motor 500 can provide a predetermined rate of rotation to the hub 334, the rotor 332 and other rotatable wheel components known to one skilled in the art. It is also appreciated that the shaker system 400 can provide a vertical vibration profile to the axle assembly 330 through the shaker rod 420 and move or cause displacement of the axle assembly 330 in an up and down direction 1. In some instances the vertical displacement profile is based or derived from real pavement or road conditions and/or data. In this manner, the sub-frame 300 can be subjected to driving conditions experienced by a motor vehicle.

Figure 4:
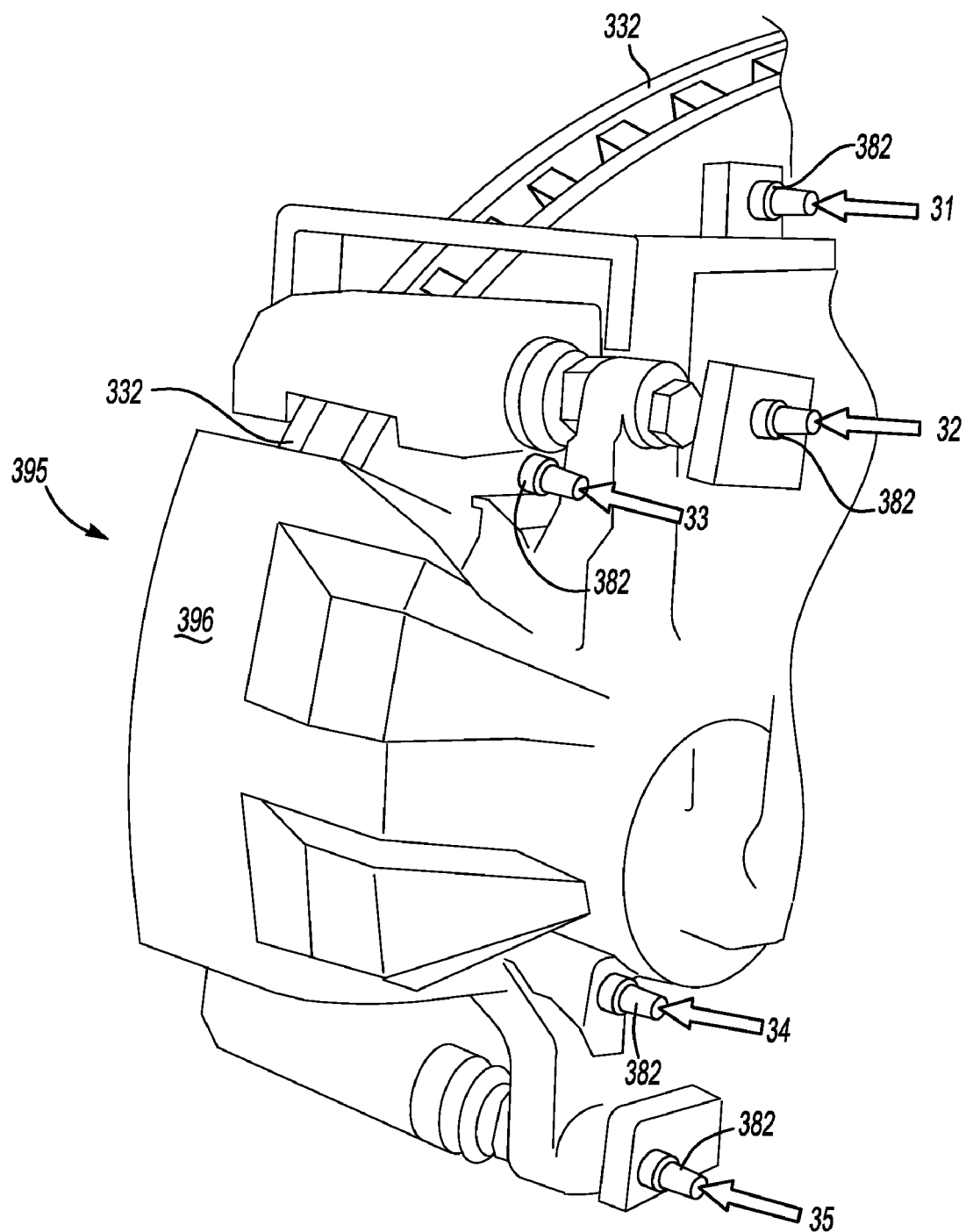
FIG. 4 is a perspective view of an inboard side of a brake housing.
Figure 5:
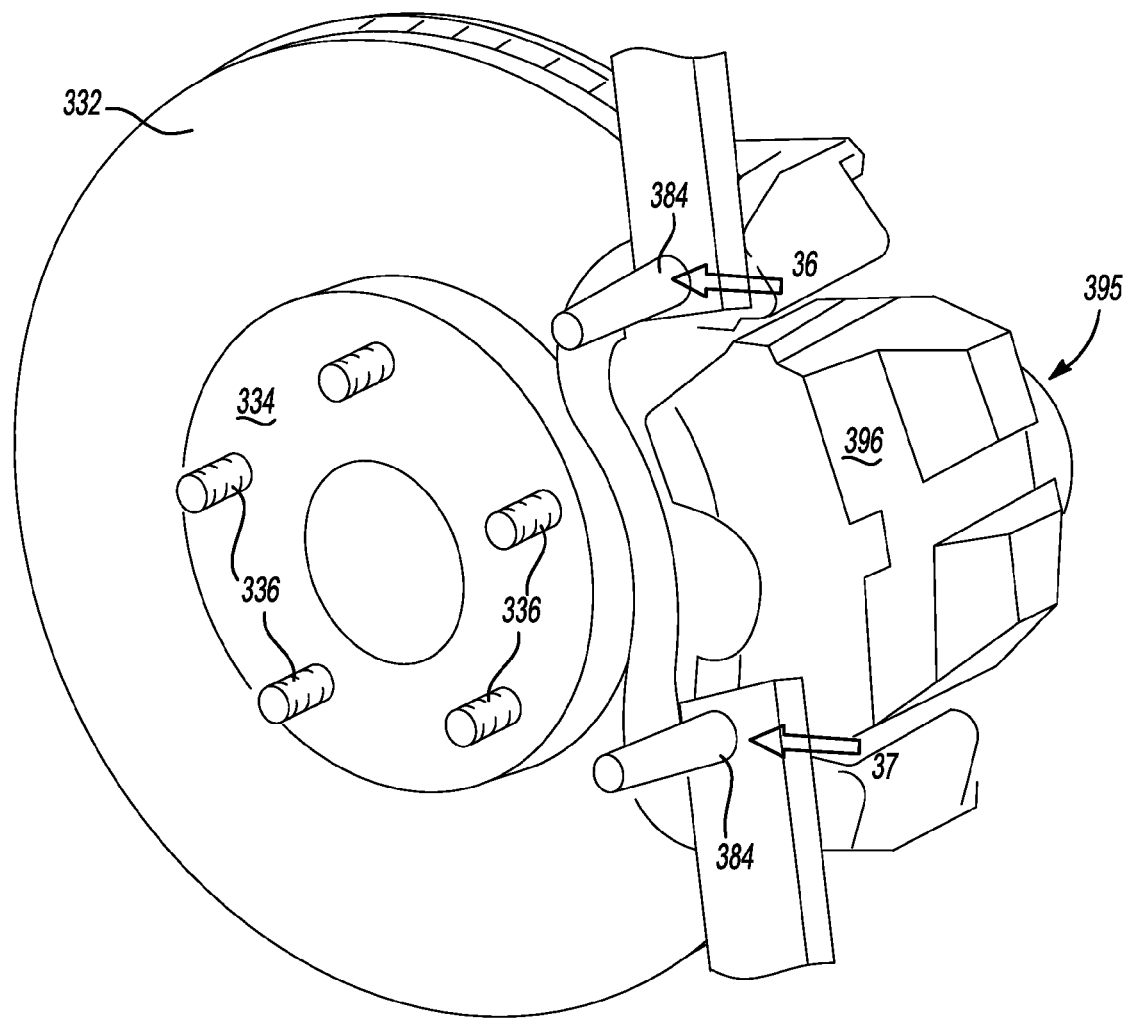
FIG. 5 is a perspective view of an outboard side of a brake housing.

Turning now to FIGS. 4 and 5, perspective views of an inboard side and an outboard side of a brake assembly 395 are shown, respectively. The brake assembly 395 can include a brake housing 396 with a portion of the rotor 332 being located at least partially within the housing 396. Although not specifically shown in FIGS. 4 and 5, it is known to those skilled in the art that the brake housing 396 can have at least one brake caliper and one brake pad therein. In addition, the brake housing 396 can include a leading brake caliper and a trailing brake caliper. The terms "leading" and "trailing" correspond to the approximate location of the brake housing where the brake rotor 332 enters and exits the housing 396, respectively, during forward motion of a motor vehicle. Thus, the brake housing can include a brake pad and/or a caliper at leading and trailing locations on the inboard side and/or outboard side of the brake housing.

Looking specifically at FIG. 4, a non-contact gap sensor 382 is shown at a plurality of locations such as 31-35. In some instances, location 31 affords for the non-contact gap sensor 382 to detect or monitor the motion of the rotor 332 as it is rotated at a predetermined rate of rotation by the motor 500 and/or as the axle assembly 330 is vibrated by the shaker system 400. Likewise, the location 32 can provide for the non-contact gap sensor 382 to detect or monitor the motion of a leading inboard caliper. In a similar fashion, the non-contact gap sensor 382 can be used to detect or monitor motion of a leading inboard brake pad at location 33, a trailing inboard brake pad at location 34 and a trailing inboard caliper at location 35. It is appreciated that a plurality of non-contact gap sensors 382 can be positioned at one or more of the locations 31-35 simultaneously in order to detect or monitor the movement of the above mentioned brake assembly 395 components during rotation of the rotor 332 and/or vibration of the axle assembly 330. In this manner, actual motor vehicle suspension components, brake components and wheel components can be tested using a relatively simple test fixture.

Looking specifically at FIG. 5, a non-contact gap sensor 384 can be located at locations 36 and 37 and provide detection or monitoring of the movement of outboard side brake assembly 395 components. For example, the non-contact gap sensor 384 at location 36 can detect or monitor the movement of a leading outboard brake pad while the non-contact gap sensor 384 at the location 37 can detect or monitor the movement of a trailing outboard brake pad. It is appreciated that the figures show the sub-frame 300 without a motor vehicle tire attached to the axle assembly 330, however this is not required and it is understood that the tire may or may not be attached to the hub 334 using the one or more threaded studs 336. In addition, although the non-contact gap sensors 382 and 384 are shown located and/or attached to the brake assembly 395, it is appreciated that the sensors can be located at other positions relative to the sub-frame 300. For example and for illustrative purposes only, the non-contact gap sensors 382 and/or 384 could be attached to a steering gear housing 340, the tie rod 350, the shock absorber 360, the suspension lower arm 370 and the like, and thereby afford for detection or monitoring of sub-frame components other than those associated with the axle assembly 300.

A process for testing a motor vehicle suspension, brake components and wheel components on the motor vehicle sub-frame 300 can include providing the lower frame 100 and attaching the lower frame 100 to the base 20. The sub-frame 300 can be attached to the lower frame 100 and the upper frame 200 can be oppositely disposed from the lower frame 100 and attached to the sub-frame 300 also. As shown in FIG. 1, the lower frame 100 can be attached to the underside of the sub-frame 300 while the upper frame 200 can be attached to the upper side. The legs 210 of the upper frame 200 can support the upper beam member 220 which further supports the support plate 230. The support plate 230 can have at least one ride height support member 232 extending therefrom, the ride height support member 232 being in the form of a rod, tube, plate and the like. The ride height support member 232 can include a tab 233 that affords for the ride height adjustment member 240 to be attached thereto. It is appreciated that the ride height adjustment member 240 can be in the form of a tension or compression member such as a spring, hydraulic cylinder and the like. The ride height adjustment member 240 can also have a first end 242 that is attached to the tab 233 and a second end 244 that is attached to a spring insulator 362. The spring insulator 362 is attached to the shock absorber 360 and affords for the ride height adjustment member 240 to apply a predetermined compression to the shock absorber 360. In this manner, a ride height is provided to the axle assembly 330, shock absorber 360 and suspension lower arm 370.

The shaker system 400 is provided with one or more shakers 410 rigidly attached to the sub-frame 300. In some instances, the shaker system 400 is fixedly attached to the steering knuckle 390. Although not shown in the figures, it is appreciated that the shaker system 400 is in electronic communication with a microprocessor that can control the shaker system 400 and thereby provide a vertical displacement profile with vibrations having predefined frequency(ies) and magnitude(s) to the sub-frame 300. The motor 500 is provided and attached to the axle assembly 330 via the first gear 510, the second gear 520 and/or the shaft 530. The motor 500 is operable to provide one or more desired rates of rotation to the shaft 530 and thereby to the hub 334, rotor 332 and the like. The non-contact gap sensor 382 and/or 384 can be attached to the sub-frame 300 and provide detection or monitoring of the movement between a first sub-frame component and a second sub-frame component. It is appreciated that the non-contact gap sensors 382 and 384 provide the detection or monitoring while the shaker system 400 provides a predefined vertical displacement profile to the sub-frame 300 and/or while the motor 500 provides a predefined rate of rotation to a wheel component.

In addition to testing the sub-frame 300 under predetermined vertical displacement profiles and/or rates of rotor rotation, alignment of wheel components for the sub-frame 300 can be altered and their effect upon the movement of the sub-frame components determined. In some instances, the alignment of the wheel components includes changing the camber, the caster and/or the toe of the axle assembly 330. In this manner the movement of sub-frame components using non-contact gap sensors before and/or after alignment changes to wheel components can be provided.

The invention is not restricted to the illustrative examples and embodiments described above. The embodiments are not intended as limitations on the scope of the invention. Processes, test fixtures, apparatus and the like described herein are exemplary and not intended as limitations on the scope of the invention. As such, changes therein and other uses will occur to those skilled in the art. The scope of the invention is defined by the scope of the claims.

We claim:

1. A test fixture for testing a motor vehicle suspension, brake components and wheel components on a motor vehicle sub-frame, said test fixture comprising:
   a base surface;
   a lower frame attached to said base surface;
   an upper frame oppositely disposed to said lower frame;
   a sub-frame attached between said lower frame and said upper frame;
   said lower frame and said upper frame holding said sub-frame above said base surface;
   a shaker system attached to said base surface and said sub-frame, said shaker system operable to provide a predetermined vertical displacement profile to said sub-frame;
   a motor attached to an axle assembly on said sub-frame and operable to rotate a rotor of said sub-frame at a predetermined rate of rotation;
   a non-contact gap sensor attached to said sub-frame, said non-contact gap sensor operable to and detect movement between a first sub-frame component and a second sub-frame component of said sub-frame when said shaker system provides the predetermined vertical displacement to said sub-frame.

2. The test fixture of claim 1, further comprising a shaker rod extending from said shaker system and attached to a lower side of the sub-frame.

3. The test fixture of claim 2, wherein said shaker rod has a pair of opposing ends, each of said opposing ends having a heim joint for attaching said shaker rod to said shaker system and said lower side of said sub-frame.

4. The test fixture of claim 1, wherein said non-contact gap sensor is located on an inboard side of a brake housing.

5. The test fixture of claim 1 wherein said first sub-frame component and said second sub-frame component are selected from the group consisting of a brake housing, a rotor, a leading inboard caliper, a leading inboard brake pad, a trailing inboard brake pad, a trailing inboard caliper, a leading outboard caliper, a leading outboard brake pad, a trailing outboard brake pad and a trailing outboard caliper.

6. The test fixture of claim 1, wherein said non-contact gap sensor is located on an outboard side of a brake housing.

7. A process for testing a motor vehicle suspension, brake components and wheel components on a motor vehicle sub-frame, the process comprising:
  providing a lower frame attached to a base surface;
  attaching a motor vehicle sub-frame to the lower frame;
  providing an upper frame oppositely disposed to the lower frame;
  attaching the upper frame to an upper side of the sub-frame;
  providing a shaker system operable to provide a predetermined vertical displacement profile to the sub-frame;
  attaching the shaker system to the base surface and the sub-frame;
  providing a motor operable to rotate an axle assembly on the sub-frame at a predetermined rate of rotation to a wheel rotor of the sub-frame;
  attaching the motor to the wheel rotor on the sub-frame;
  providing a non-contact gap sensor operable to detect movement between a first sub-frame component and a second sub-frame component;
  attaching the non-contact gap sensor to the sub-frame;
  applying the vertical displacement profile to the sub-frame using the shaker system; and
  detecting movement between the first sub-frame component and the second sub-frame component using the non-contact gap sensor.

8. The process of claim 7, further including applying rotation to the axle assembly using the motor.

9. The process of claim 8, further including providing a steering unit attached to the sub-frame and operable to turn the wheel rotor.

10. The process of claim 8, further including a shaker rod attached to and extending between the shaker system and the sub-frame.

11. The process of claim 10, further including the shaker rod having two opposed ends, each opposed end having a heim joint for attaching the shaker rod to the shaker system and the sub-frame.

12. The process of claim 8, wherein the non-contact gap sensor is located on an inboard side of a brake housing.

13. The process of claim 8, wherein the first sub-frame component and the second sub-frame component are selected from the group consisting of a brake housing, a rotor, a leading inboard caliper, a leading inboard brake pad, a trailing inboard brake pad, a trailing inboard caliper, a leading outboard caliper, a leading outboard brake pad, a trailing outboard brake pad and a trailing outboard caliper.

14. The process of claim 8, wherein the non-contact gap sensor is located on an outboard side of a brake housing.

15. The process of claim 8, further including changing an alignment of the wheel components on the sub-frame and then detecting the movement between the first sub-frame component and the second sub-frame component using the non-contact gap sensor.

16. The process of claim 15, wherein the changing the alignment of the wheel components includes changing a camber of the wheel components.

17. The process of claim 15, wherein the changing the alignment of the wheel components includes changing a caster of the wheel components.

18. The process of claim 15, wherein the changing the alignment of the wheel components includes changing a toe of the wheel components.

* * * * *